(12) United States Patent
Matt et al.

(10) Patent No.: US 6,510,507 B1
(45) Date of Patent: Jan. 21, 2003

(54) PAGE ADDRESS LOOK-UP RANGE RAM

(75) Inventors: David Matt, Missouri City, TX (US);
Marulkar Rajendra Sadanand, Pune (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/517,986

(22) Filed: Mar. 3, 2000

(51) Int. Cl.$^7$ ................................................ C06F 12/00
(52) U.S. Cl. ...................... 711/206; 711/207; 711/208; 711/220; 714/45; 365/189.07
(58) Field of Search .......................... 711/206–208, 220; 714/45; 365/189.07

(56) References Cited

U.S. PATENT DOCUMENTS 5,303,359 A * 4/1994 Suzuki ........................ 711/207
5,396,605 A * 3/1995 Sawamoto ................... 711/207

* cited by examiner

*Primary Examiner*—Do Hyun Yoo
*Assistant Examiner*—Mehdi Namazi
(74) *Attorney, Agent, or Firm*—W. Daniel Swayze, Jr.; W. James Brady; Frederick J. Telecky, Jr.

(57) ABSTRACT

A Page Address Look-up Range RAM is disclosed which allows for individual comparisons to be made on a number of consecutive addresses. The upper bits of the bus address 410 (often representing a "page") are compared against one or more reference registers 430–437 to yield one or more "match_high"s. The lower bits of the same bus address 420 are used to look-up the value of "match_low" in a Page Look-Up RAM 440, the bit of interest corresponding to the particular "match-high" reference register i.e. 430. If both the "match_high" and "match_low" events are true, or=1, then the bus address has matched and should cause the event, otherwise not. The most cost effective implementations will have a Look-up RAM 440 with a width of a multiple of 8. This will allow comparison of the bus address against a multiple of individual pages.

7 Claims, 6 Drawing Sheets

PAGE ADDRESS LOOK-UP RANGE RAM

CITATION OF RELATED APPLICATIONS

This application is related to co-assigned applications all of which are incorporated herein by reference:

Ser. No. 09/154,385 (TI-27298) entitled "METHOD OF INITIALIZING A CPU CORE EMULATION" filed Sep. 16, 1998, now U.S. Pat. No. 6,167,365; and the following contemporaneously filed applications:

Ser. No. 09/483,367 (TI-28928), entitled "EMULATION SUSPEND MODE WITH DIFFERING RESPONSE TO DIFFERING CLASSES OF INTERRUPTS";

Ser. No. 09/481,852 (TI-28929), entitled "EMULATION SUSPENSION MODE WITH STOP MODE EXTENSION";

Ser. No. 09/483,568 (TI-28930), entitled "EMULATION SUSPEND MODE HANDLING MULTIPLE STOPS AND STARTS";

Ser. No. 09/483,697 (TI-28931), entitled "EMULATION SUSPEND MODE WITH FRAME CONTROLLED RESOURCE ACCESS";

Ser. No. 09/482,902 (TI-28932), entitled "EMULATION SUSPEND MODE WITH INSTRUCTION JAMMING";

Ser. No. 09/483,237 (TI-28934), entitled "EMULATION SYSTEM WITH SEARCH AND IDENTIFICATION OF OPTIONAL EMULATION PERIPHERALS";

Ser. No. 09/483,783 (TI-28935), entitled "EMULATION SYSTEM WITH ADDRESS COMPARISON UNIT AND DATA COMPARISON UNIT OWNERSHIP ARBITRATION";

Ser. No. 09/481,853 (TI-28936), entitled "EMULATION SYSTEM WITH PERIPHERALS RECORDING EMULATION FRAME WHEN STOP GENERATED"; and Ser. No. 09/483,321 (TI-28937) entitled "EMULATION SYSTEM EMPLOYING SERIAL TEST PORT AND ALTERNATIVE DATA TRANSFER PROTOCOL."

TECHNICAL FIELD OF THE INVENTION

The technical field of this invention is complex integrated circuits including embedded digital processor cores and more particularly in the method of making address comparisons much more efficient.

BACKGROUND OF THE INVENTION

Programmable digital processors such as microprocessors and digital signal processors have become very complex machines. Testing these programmable digital processors has also become complex task. It is now common for semiconductor manufactures to build single integrated circuit programmable digital processors with millions of transistors. The current trend is to devote many of these transistors to on-chip cache memories. Even so, the number of logic circuits and their complex relationships makes testing such integrated circuits an increasingly difficult task.

A trend in electronics makes this testing problem more difficult. Single integrated circuit programmable digital processors are becoming more and more of the electronics of many end products. A single integrated circuit used in this way typically includes a programmable digital processor, read only memory storing the base program, read/write memory for operation and a set of peripherals selected for the particular product. This trend is known as system level integration. In the ultimate system level integration, all the electronics are embodied in a single integrated circuit. This level of integration is now achieved in electronic calculators. Many electronic calculators consist of a single integrated circuit, a keyboard, a display, the battery or solar panel power source and a plastic case. Such integration provides less "visibility" into the operation of the programmable digital signal processor. Because the address and data busses of the digital processor are no longer brought out the device pins, as was done in the past, it is more difficult to determine the behavior of the embedded processor from external connections.

Another trend in electronics makes this testing problem more difficult. Many new product applications require differing types of processing. Often control processes and user interface processes are better handled with a different programmable digital processor than digital signal processes. An example is wireless telephones. Many coding/decoding and filtering tasks are best handled by a digital signal processor (DSP). Other tasks such as dialing, controlling user inputs and outputs are best handled by microprocessors such as a RISC (Reduced Instruction Set Computer) processor. There is a trend for a system integrated circuit to include both a RISC processor and a DSP. These two processors will typically operate independently and employ differing instruction set architectures. Thus there may be more than one programmable digital processor on a single integrated circuit, each having limited visibility via the device pins.

Another problem is product emulation when employing these programmable digital processors. Product development and debugging is best handled with an emulation circuit closely corresponding to the actual integrated circuit to be employed in the final product. In circuit emulation (ICE) is in response to this need. An integrated circuit with ICE includes auxiliary circuit not needed in the operating product included solely to enhance emulation visibility. In the typical system level integration circuit, these emulation circuits use only a very small fraction of the number of transistors employed in operating circuits. Thus it is feasible to include ICE circuits in all integrated circuits manufactured. Since every integrated circuit can be used for emulation, inventory and manufacturing need not differ between a normal product and an emulation enhanced product.

Real-time trace and debug/analysis systems for embedded systems need to provide the user With means of triggering on selective events, such as the CPU accessing particular memory locations. This can be done with a single bus monitor, which compares the address on the bus to a reference address. If it matches, then the event occurs. This approach is typically expanded through the use of multiple point comparators used in parallel; however, because each reference address requires dedicated logic gates, this is an expensive implementation. This approach is typically expanded further through the use of magnitude comparators, which allows the address on the bus to be compared to an entire range of addresses. The problem with magnitude comparators is that a reference address is determined to be greater/equal (or less than) the address on the bus. Although this comparison covers an entire range of addresses, a "greater/equal (or less than)" comparison requires significantly more logic gates than does a single "equals/not-equals" comparison.

By allowing the user to specify ranges of addresses on which to cause the events when accessed, the user has a considerably more powerful debug tool. However, this implementation requires a large number of gates, often commonly causes speed paths, and is often not well suited to peripheral or ASIC registers which as mapped in memory (since not all registers within a group will have the same events associated with them). What is need is a fast, low-cost means of comparing a bus address against numerous individual addresses simultaneously. This would allow the user to specify what memory-mapped variables, peripheral registers, and/or ASIC registers to cause (or not cause) events on.

SUMMARY OF THE INVENTION

A Page Address Look-up Range RAM is disclosed which allows for individual comparisons to be made on a number of consecutive addresses. The upper bits of the bus address (often representing a "page") are compared against one or more reference registers to yield one or more "match_high"s. The lower bits of the same bus address are used to look-up the value of "match_low" in a RAM, the bit of interest corresponding to the particular "match-high" reference register. If both the "match_high" and "match_low" events are true, or=1, then the bus address has matched and should cause the event, otherwise not. The most cost effective implementations will have a Look-up RAM with a width of a multiple of 8. This will allow comparison of the bus address against a multiple of individual pages.

One advantage of using a Page Address Look-up RAM is the large number of possible individual comparisons available at relatively low cost. The large number of individual comparisons allow the user to be selective as to what addresses cause (or don't cause) an event.

A second advantage of using a Page Address Look-Up RAM is that, because the lookup RAM can be implemented through memory cells, it can be implemented with less silicon area than one which requires primarily logic gates. Because no magnitude comparator is used, there is less of a speed path.

A third advantage of the using a Page Address Look-up RAM is that it allows multiple comparisons to be done, without requiring dedicated logic gates for every single reference address.

A fourth advantage of using a Page Address Look-up RAM is that it allows for individual addresses to be compared against, rather than an entire range, which is often desired for memory-mapped variables, peripheral registers, etc.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
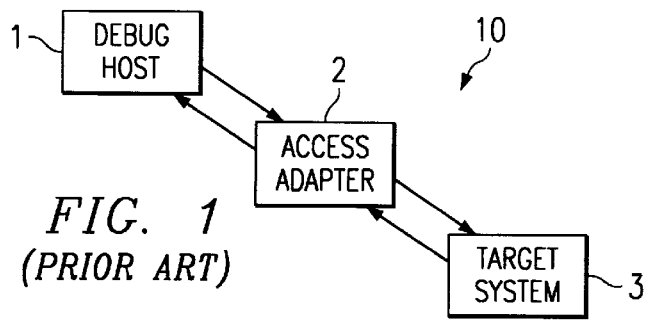
FIG. 1 illustrates the environment of the debugging system of this invention which is known in the art.

FIG. 1 illustrates the environment of the debugging system of this invention. This environment connects high level debugging software executing on a debug host computer 1 to a low level debug interface supported by the target system 3. In this invention the target system 3 may include more than one programmable digital processor and possibly more than one such programmable digital processor on a single integrated circuit. In this application the term programmable digital processor is meant to encompass devices commonly known as microprocessors, microcontrollers and digital signal processors. The target system 3 provides a standard interface to the access adapter 2.

Debug host computer 1 consists of a computer, for example a PC, running a CPU core specific software debugger as one of its tasks. The debug host computer 1 allows the user to issue high level commands such as setting breakpoint, single stepping the programmable digital processor in target system 3 and displaying the contents of a memory range.

Access adapter 2 is a combination of hardware and software that connects the debug host computer 1 to target system 3. Access adapter 2 utilizes one or more hardware interfaces and/or protocols to convert messages created by user interface commands of debug host computer 1 into debug commands operable on target system 3. Access adapter 2 can be either loosely coupled or tightly coupled to the debug host computer 1. In the case of a PC host computer, access adapter 3 can be an XDS 510 scan controller attached directly to the PC bus. This implements a tightly coupled configuration requiring the PC to perform even the lowest level actions necessary to manage debug activity. In loosely coupled configurations, debug host computer 1 CPU communicates with another processor over a high bandwidth interface such as a SCSI, LAN or other interface. An example of this is a XDS 510WS controller connected to the target system debug interface and to the PC through a SCSI port. In this case access adapter 2 is a debug subsystem manager and handles the detailed manipulation of the target debug capability, and debug host computer 1 send high level commands to the debug subsystem. Access adapter 2 returns data and error conditions to debug host computer 1. Current PC operating systems may not be able to service the low level debug requirements continuously. Thus it may be advantageous to partition the problem into the display and user interface and control sections.

The target system 3 contains one or more programmable digital processor cores. The programmable digital processor core(s) contain hardware designed explicitly to ease debugging. This special hardware of target system 3 is the lowest element of the system debug environment 10. The programmable digital processor core debug facilities allow the user to control the program execution, examine or change system memory, core CPU resources in real-time.

The interface of access adapter 2 to target system 3 is preferably an extension to the IEEE 1149.1 (JTAG) test standard. The JTAG standard includes 5 primary signals known as nTRST, TCK, TMS, TDI, and TDO. The JTAG standard typically employs three additional signals Test Clock Out (TCKO), the target supply (Vdd) and ground (GND). The preferred embodiment of this invention also employs the two extension signals nET1 and nET0. Table 1 lists these signals, states whether the signal is an input, an output or both, and gives the descriptive name of the signal.

TABLE 1

| Pin | Type Input/Output | Description |
|---|---|---|
| nTRST | I | Test Logic Reset Not |
| TCK | I | Test Clock |
| TMS | I | Test Mode Select |
| TDI | I | Test Data Input |
| TDO | O | Test Data Output |
| TCKO | O | Test Clock Out |
| PD(Vdd) | I | Target Power Supply |
| GND | I/O | Ground |
| nET1 | I/O | Emulation and Test 1 Not |
| nET0 | I/O | Emulation and Test 0 Not |

The signal nTRST is called Test Logic Reset Not. A low applied to this pin causes all test and debug logic in the target device to be reset along with the IEEE 1149.1 interface.

The signal TCK is called Test Clock. This signal is used to drive the IEEE 1149.1 state machine and logic. The same TCK supplied to the target device is supplied to this pin.

The signal TMS is called Test Mode Select. This signal directs the next state of the IEEE 1149.1 test access port state machine.

The signal TDI is called Test Data Input. This signal is the scan data input to the target device.

The signal TDO is called Test Data Output. This signal is the scan data output of the target device.

Figure 2:
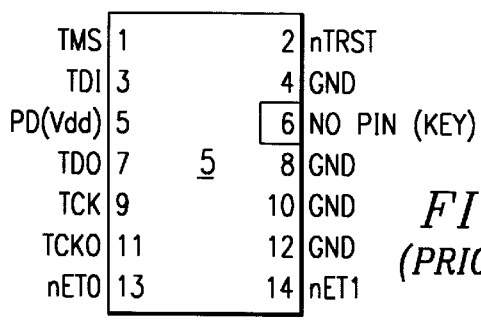
FIG. 2 illustrates the known 14-pin JTAG header used to interface the target system to the access adapter.

FIG. 2 illustrates a 14-pin JTAG header used to interface target system 3 to access adapter 2. The JTAG header requires three additional pins and further includes two extension pins. The signal TCKO is called Test Clock Out. This signal is a test clock supplied by the scan controller to the target system. This test clock can be used as the system TCK source, or it can be ignored with the TCK source being generated by the target system. In many target systems, TCKO is simply connected to TCK and used as the test clock. The PD(Vdd) is called the Target Power Supply. This is used as a power detect input to access adapter 2. The JTAG header also includes ground connections.

The preferred embodiment of this invention includes an extension to the JTAG interface. Two pins nET0 and nET1 serve as a two pin trigger channel function. This function supplements the serial access capability of the standard interface with continuous monitoring of device activity. The two added pins create debug and test capabilities that cannot be created with the standard interface. The nET0 signal is called Emulation and Test 0 Not. This signal helps create a trigger to channel zero. Similarly, the nET1 signal is called Emulation and Test 0 Not. This signal helps create a trigger to channel one. These channels will be further explained below.

Figure 3:
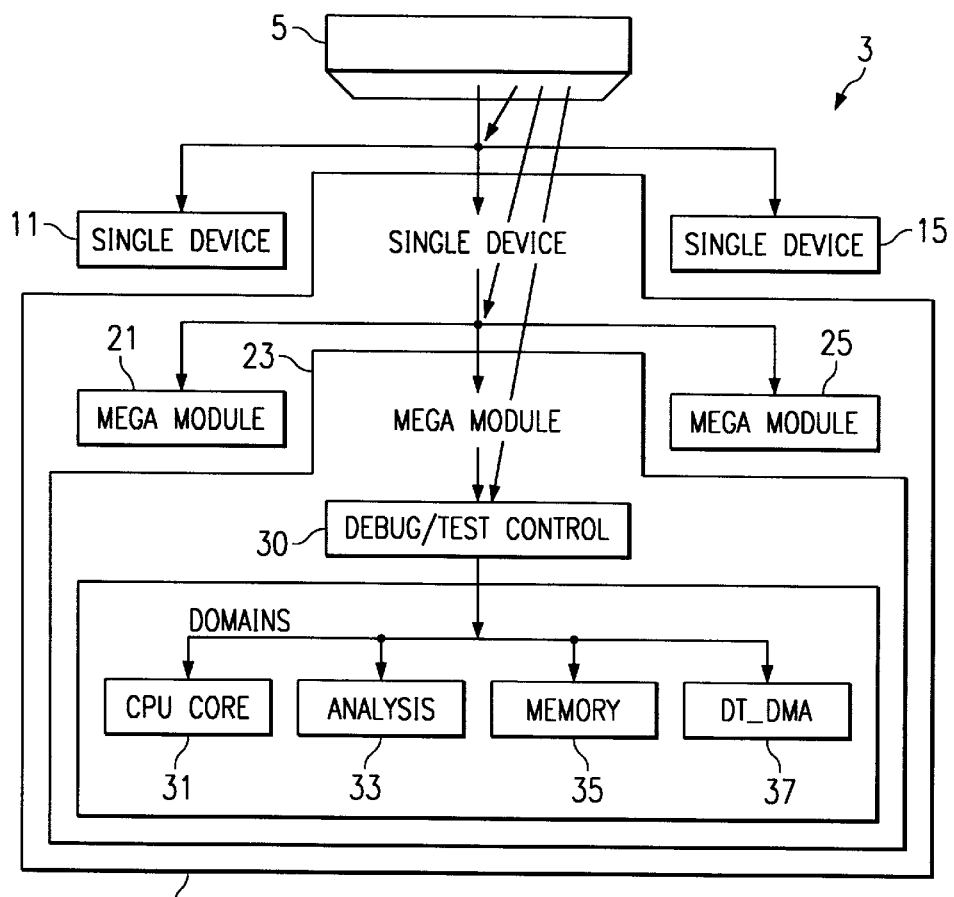
FIG. 3 illustrates an emulation level view of the target system.

FIG. 3 illustrates an emulation level view of target system 3. Target system 3 may include plural devices 11, 13 and 15. FIG. 3 illustrates details of example device 13 which includes plural megamodules 21, 23 and 25. FIG. 3 illustrates details of example megamodules 23. Example megamodule 23 includes debug and test control unit 30 and plural device domains. These device domains include central processing unit (CPU) core 31, analysis unit 33, memory 35 and debug/test direct memory access (DT_DMA) unit 37.

Debug and test control unit 30 contains the IEEE interface. It provides a bridge between the Extended IEEE Interface and the debug and test capability distributed through the domains. Debug and test control unit 30 can independently control by the domains 31, 33, 35 and 37. In other words, one or more domains can be scanned or controlled while other domains continue operate in their normal functional way.

Figure 4:
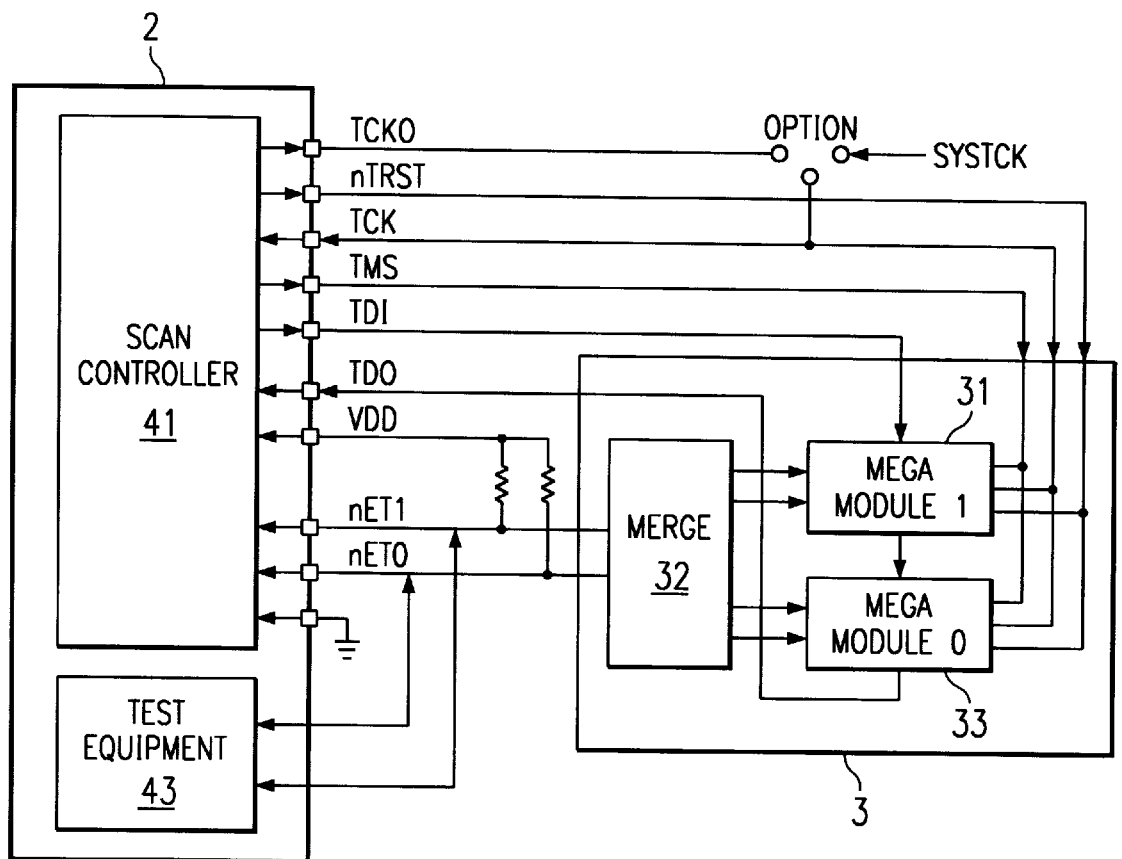
FIG. 4 illustrates an electrical connection view of the coupling between the access adapter and the target system.

FIG. 4 illustrates an electrical connection view of the coupling between access adapter 2 and target system 3. FIG. 4 shows the connections of the of the various signals of the JTAG header 5 illustrated in FIG. 2. All these signals are connected to scan controller 41. The signals nTRST, TCK and TMS are connected to two example megamodules 31 and 33. FIG. 4 illustrates the optional connection of TCKO to the target system clock SYSCLK. The scan input TDI connects to a scan input of megamodule 31. The scan output of megamodule 31 supplies the scan input of eg module 33. The scan output of meg module 33 supplies the scan output TDO. The two extension signals nET0 and nET1 control meg modules 31 and 33 via merge unit 32. These extension signals are monitored by test equipment 43.

The debugging environment illustrated in FIGS. 1 to 4 permit the user to control application execution by any programmable digital processor of target system 3. Typical control processes include: keyboard directives such as run, halt and step; software breakpoint using op-code replacement; internal analysis breakpoint specified program counter or watchpoints specified by data accesses; and externally generated debug events.

Actions such as decoding a software breakpoint instruction (DSTOP), the occurrence of an analysis breakpoint or watchpoint (ASTOP), or the occurrence of a debug host computer event (HSTOP) are referred to as debug events. Debug events cause execution to suspend. Debug events tied to the execution of specific instructions are called breakpoint. Debug events generated by memory references are called watchpoints. External debug events can also suspend execution. Debug events cause entry into the Debug State.

Figure 5:
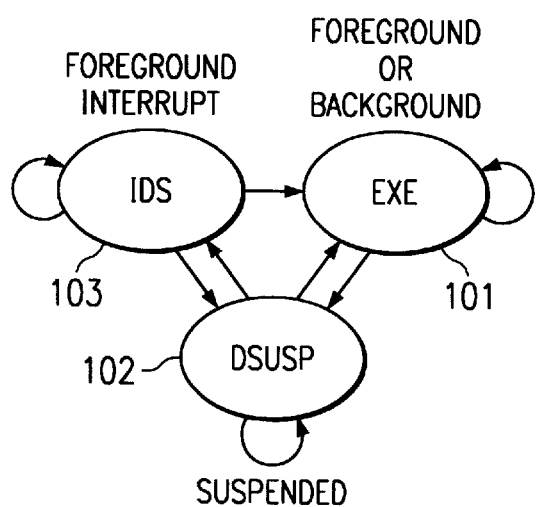
FIG. 5 illustrates the possible operation states in the debugging environment of the preferred embodiment of this invention.

FIG. 5 illustrates the possible operation states in the debugging environment of the preferred embodiment of this invention. These operation states are execute (EXE) 101, debug suspend (DSUSP) 102 and interrupt during debug suspend (IDS) 103.

Execute state 101 corresponds to the ordinary operation of target device 3. In the execute state 101 instructions are executed by the programmable digital processor in normal fashion. There are no outstanding debug suspend conditions. A low logic level applied to the nTRST terminal or a software directive requesting functional run forces the operational state to execute state 101. In execute state 101 the pipeline fetches and executes instructions and process interrupts in a normal way.

The operational state transits from execute state 101 to debug suspend state 102 upon a debug event. The debugging environment of the preferred embodiment of this invention allows the suspension of program execution at points defined by breakpoint, watchpoints, and debug software directives, provided the application is an allowable debug suspend window. In general, debug events are allowed at an instruction boundary, when reset is inactive and no interrupts are active. Program execution suspends at an instruction boundary and the operational state changes to debug suspend state 102. When any debug condition is not met, the operational state remains in execute state 101 and no debug event processing occurs. The debugging environment permits debug event processing in the delayed slots of delayed branch instructions. Debug events occurring outside the debug suspend window create a debug pending condition. This condition suspends program execution when the application enables debug interrupts by opening the debug suspend window.

In the debug suspend state 102 background instruction execution is inactive. This state permits debug/emulation visibility into the state of target device 3 while background execution is suspended. In debug suspend state 102, the program counter (PC) and status bits are generally preserved at their values prior to the debug event. The PC points to the instruction to be executed next. When execution resumes, the instruction referenced by the PC and those following is fetched for execution. This is facilitated by flushing the front end of the pipeline upon entry into debug suspend state 102 from execute state 101.

The operational state may return to execute state 101 by a debug run directive. This may be either an unconditional run directive or a single step run directive. A single step run directive enters execute state 101 long enough to advance the instruction pipeline one stage and then returns to debug suspend state 102.

It is important to note that debug suspend state 102 consumes no CPU bandwidth because no monitor code executes as a result of suspending execution. The debug architecture provides for complete register and memory accessibility without the aid of a monitor program. The user may change the operating mode at any time without restrictions.

Certain interrupts transit the operation state from debug suspend state 102 to interrupt during suspend (IDS) state 103. These interrupts are defined by a separate interrupt mask independent of the normal interrupt mask. Those interrupts defined as high priority interrupts (HPI) or foreground interrupts cause the operation state to enter the interrupt during suspend state 103 from the debug suspend state 102. The debug suspend state 102 enables high priority interrupts independent of the state of the global interrupt enable bit or of software run directives. This enables debugging of background tasks while the target device 3 continues to service a real time application via high priority interrupts.

The interrupt pipeline jam for such a high priority interrupt moves the operational state to interrupt during suspend state 103. This jam causes an extra word to be pushed on the stack containing the debug status describing the reason the debug suspend state 102 entry occurred. Interrupt during suspend state 103 differs from the execute state 101 in that the interrupt processing creates a thread, linking the interrupt execution to the debug suspend state 102 as described in above. A digital frame counter (DFC) is incremented upon each high priority interrupt taken. The high priority interrupt sets an interrupt during debug state bit (IDS), which is part of the CPU status. The IDS bit sets after the context save stores the previous value on the stack with the status word. When returning from an interrupt the IDS bit indicates whether to re-enter debug suspend state 102. If the IDS bit is set, the interrupt occurred during a debug suspend state 102 and the operational state should return to the debug suspend state 102. If the IDS bit is not set, the interrupt occurred during the execute state 101 and the operational state should return to execute state 101. Upon returning from the interrupt, the PC and status return to their state before the interrupt unless the interrupt service routine has purposely modified values on the stack. This is required because it is possible for multiple interrupts to occur and be serviced while the device is in debug suspend state 102.

The digital frame counter is decremented upon each return from interrupt. This count permits the debug environment to track the status of the suspended foreground task. For example, a taken high priority interrupt may change the machine state and thus the current machine state would not reflect the suspended background task. However, if the digital frame counter were zero, then the debug environment is assured no interrupts have not temporarily changed the machine state.

The interrupt during suspend state 103 is exited at the end of the interrupt service routine. A normal end of an interrupt involves a return from interrupt instruction (RTI). Upon execution of a return from interrupt instruction, the machine status is popped from the stack. As noted above, the interrupt during debug state bit indicates whether the interrupt occurred during execute state 101 or debug suspend state 102. The operational state return to the former state as indicated by the interrupt during debug state bit. The prior value of the program counter is reloaded to recover the prior machine status. Execution of a return from interrupt instruction also decrements the digital frame counter. Because it is possible to receive a higher priority interrupt while servicing a prior interrupt, more than one interrupt level may be pending. The digital frame counter indicates the current interrupt level. This is useful to debug processing as the machine status may be changed by the multiple interrupts. The debug software can read the digital frame counter and supply a debug level identity to identify currently targeted interrupt level. Execution and register operations target a specific debug level. Memory operations can target a specific debug level or bypass the level comparison. In particular, the status of the background task suspended on initial entry into debug suspend state 102 can only be reliably determined if the digital frame counter is zero. The maximum number of levels of the digital frame counter corresponds to the size of the interrupt hierarchy. This data preserves a path back to the debug suspend state 102 when the application concludes the interrupt service routine with a return from interrupt instruction.

The interrupt during suspend state 103 transits to the execute state 102 upon execution of an abort interrupt (ABORTI) instruction. The abort interrupt instruction would ordinarily be used only on detection of a unrecoverable error in the interrupt service routine. The path back to the debug suspend state is broken upon execution of the abort interrupt instruction. The status of the interrupt during debug state bit and the digital frame counter are ignored in this case. In particular, the interrupt during debug state bit is cleared and the digital frame counter is set to zero. This mechanism enables recovery to the background task when a high priority interrupt service routine has an unrecoverable error.

Interrupts can be serviced the while the debug software views or modifies the CPU state. The debug state shown to the programmer reflects the machine state when there is no interrupt service routine active. The debug software works with on-chip debug support to ensure the high priority interrupts are transparent to a debug session. Likewise this hardware and software combination works to make debug activity transparent to high priority interrupt service routines. Note that program execution can actually be suspended in multiple locations if it is desired to break within a time critical interrupt while still allowing others to be serviced.

Table 2 lists all the debug related registers included in each megamodule. Miscellaneous control bits supporting the JTAG interface are not included in this list. Most but not all of the debug unit registers are placed in the memory map so they are accessible by both debug software and the application. There are three levels of register access: registers always shared by the application and debug facilities; registers accessed through the extended JTAG port only; and registers accessed through the extended JTAG port or a specially privileged monitor program but not shared.

The application and debug software share registers controlling external trigger event inputs, breakpoints and watchpoints, data logging, parallel signature analysis, and count functions. The application and debug software can not simultaneously own these resources but establish ownership and release ownership through memory mapped control registers continuously visible to both the application and debug software. The debug software has the ability to seize any resource if necessary, or negotiate with the application through software sequences.

Figure 6:
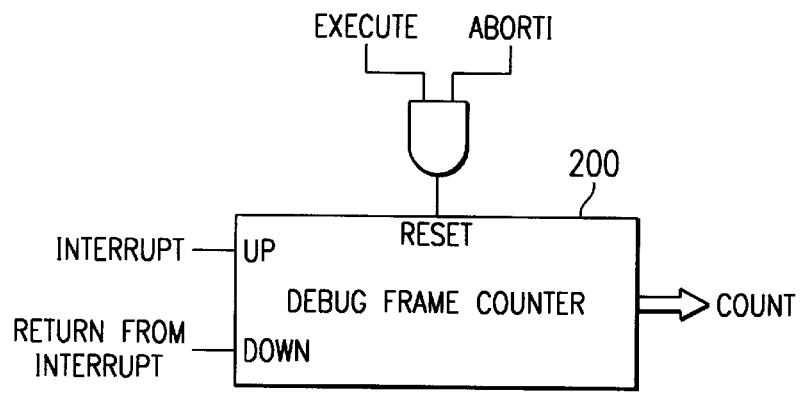
FIG. 6 illustrates the inputs and outputs of the debug frame counter.

FIG. 6 illustrates the inputs and outputs of debug frame counter 200. Debug frame counter 200 is reset to zero by either entry into execute state 101 or occurrence of an ABORTI abort interrupt instruction. Debug frame counter 200 counts up on each taken interrupt. Debug frame counter 200 counts down on each return from interrupt.

Figure 7:
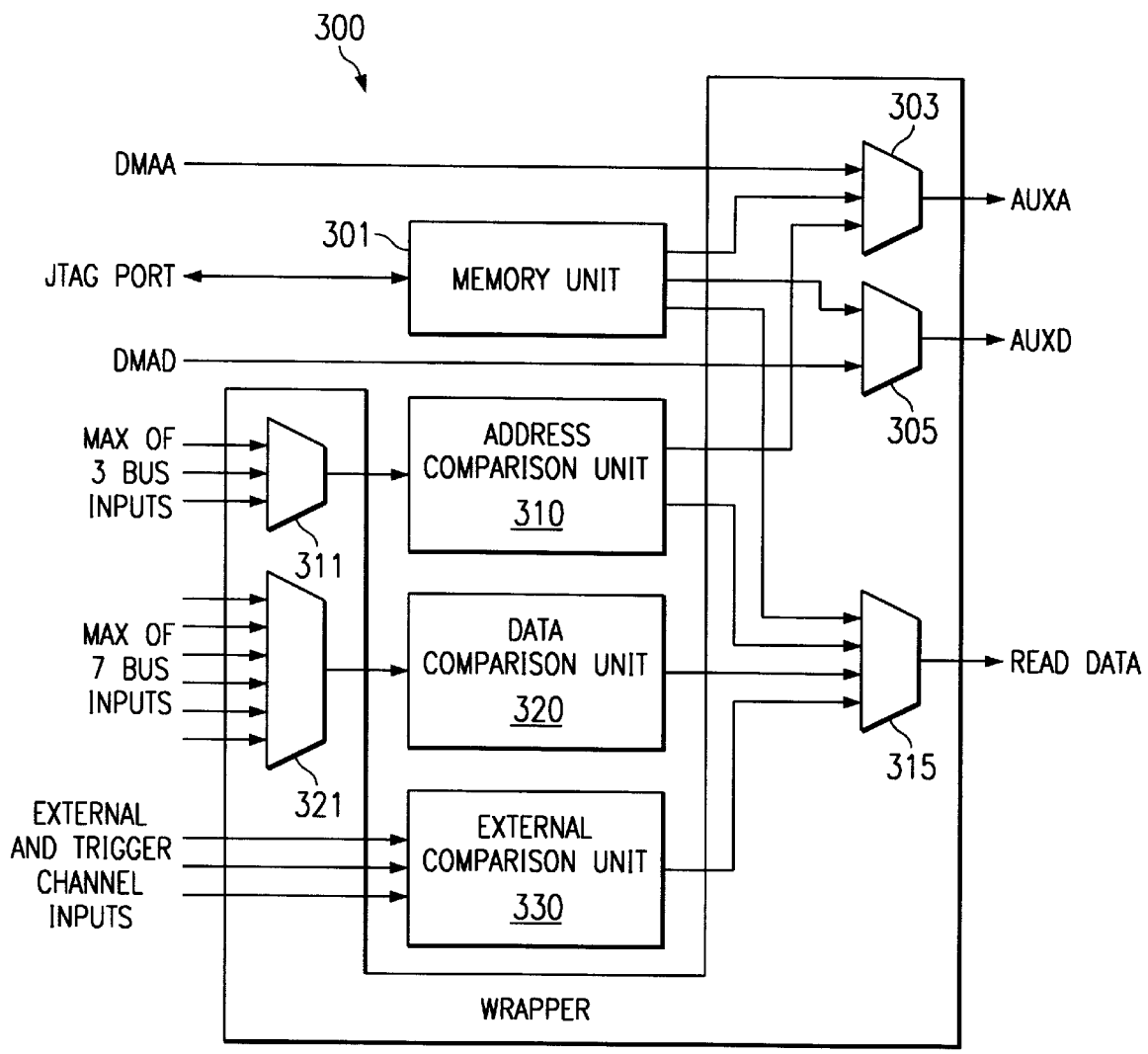
FIG. 7 illustrates in greater detail circuits located on each megamodule concerned with emulation.

FIG. 7 illustrates in greater detail circuits located on each megamodule concerned with emulation. These include address comparison unit (ACU) 310, data comparison unit (DCU) 320 and the external control unit 330 (ECU). The address comparison unit 310 provides breakpoint, counter, parallel signature analysis and data logging support. The data comparison unit 320 provides breakpoint and parallel support. The external comparison unit 330 controls external inputs to the event functions. Interaction with the programmable digital processor within the megamodule is handled by the memory unit 301. The application and debug software share access to address comparison unit 310, data comparison unit 320 and external comparison unit 330 by access to their registers.

Memory unit 301 provides the ability to read and write memory. For reads, it sources an address (AUXA) as selected by multiplexer 303 and receives either program read data (PD) or memory read data (MD) as selected by multiplexer 315. For writes it sources an address (AUXA) selected by multiplexer 303 and data (AUXD) selected by multiplexer 305.

Address comparison unit 310 contains two 32 bit registers AREF and AMSK and one 16 bit register ACNTL. The AREF and AMSK registers are preferably 32 bit data registers that can be addressed as sixteen bit registers in 16 bit architectures. Their function is defined by the ACNTL register described in Table 2. The ACNTL register configures the AREF and AMSK registers in a number of modes, including: DMA reads and writes for data logging, downloads and uploads; event generation such as breakpoints, watchpoints and nET0 and nET1 triggers; counts for benchmarking, watchdog timing and period counters; parallel signature analysis functions for test; off performing no function and ownership by the application or debug is unchanged; and unclaimed performing no function and either the application or debug can obtain ownership. Address comparison unit 310 is responsive to the bus input selected by multiplexer 311.

The address comparison unit 310 configures for event generation where the AMSK register serves as an address mask register and the a AREF register serves as an address reference. The address comparison unit 310 generates a debug suspend request when the ACNTL register ASTOP and AFEN bits are TRUE. The AMSK field defines the address comparison unit 310 debug suspend request rudeness level. The ability to generate and event without generating a debug suspend request allows the address comparison unit 310 event to be used as a trigger generator through the ETx pins without altering core execution. This function supports breakpoints, watchpoints, and trigger generation. Table 2 shows the function specific bit mode bit definition of register ACNTL for event generation.

TABLE 2

| Function | Bit(s) | Description |
|---|---|---|
| ASELA[1:0] | 08:07 | Select Address - Select address for event comparison<br>00 - Select no address<br>01 - Select program address<br>10 - Select memory address<br>11 - Reserved |
| AMSKON | 06 | Mask On - Logically OR the AMSK register contents with the address selection |
| AREVT | 05 | Write Event - Generate event on read cycles (watchpoint) |
| AWEVT | 04 | Write Event - Generate event on write cycles (watchpoint) |
| AIEVT | 03 | Instruction Event - Generate event on instruction cycles, break only if instruction executes (breakpoint) |
| AEXTQ | 02 | External Qualifier - When a one, the external qualifier input qualifies ACU event generation at the point the address comparison is made. |
| AJOIN | 01 | Join - The event for the ACU is qualified by the DCU event output. Both the ACU and DCU comparisons must be TRUE to declare an ACU event. For cases where an ACU address comparison is joined to a DCU data comparison, the ACU comparison is delayed to align in time with the DCU data comparison. |

Specific alignment of address, data, and cycle qualifiers is architecture specific to the particular programmable digital processor. Breakpoint events are processed if and only if the instruction referenced by the breakpoint tag reaches the point in the instruction decode where the instruction would execute had the break event not been generated.

The address comparison unit 310 configures for counter functions where the AMSK register serves as a counter and the AREF register either configures an eight bit counter that extends the reach of the AREF counter or serves as compare value that identifies the reload point for the AMSK counter. The counter configurations are a 40 bit benchmarking counter, a 32 bit period counter (reloadable when count reaches zero), or two sixteen bit reloadable counters. These counter functions support benchmarking, watchdog, period, and external event counting in addition to supporting execution pauses in anticipation of externally generated debug suspend requests. Table 3 shows the function specific bit mode bit definition of register ACNTL for counter functions.

TABLE 3

| Function | Bit(s) | Description |
| --- | --- | --- |
| ACM[1:0] | 08:07 | Count Mode<br>00 - Pause Period (8 bits)/Period (24 bits)<br>01 - Period (2–16 bit)<br>10 - Period (32 bits)<br>11 - Benchmark (40 bits) |
| ACEN1[1:0] | 06:05 | Count Enable<br>00 - Continuous count<br>01 - Count when DCU event output is TRUE, else no count<br>10 - Count when nET0 is TRUE, else no count<br>11 - Count when nET1 is TRUE, else no count |
| ACEN0[1:0] | 04:03 | Count Enable<br>00 - Continuous count<br>01 - Count when DCU event output is TRUE, else no count<br>10 - Count when the nET0 is TRUE, else no count<br>11 - Count when the nET1 is TRUE, else no count |
| ARL[1:0] | 02:01 | Count Reload<br>00 - No reload, roll over at zero<br>01 - Reload at zero and count<br>10 - No reload, generate debug suspend at zero, stay at zero<br>11 - Wait at zero for external start, Count up to reload, reload to zero, wait for external start<br>Reload occurs when the count value equals the reference value and a count condition occurs. |
| AFREE | 00 | Free<br>0 - count free of the CPU execution state<br>1 - if debug enable bit is FALSE, count if debug enable bit is TRUE, don't count |

The address comparison unit 310 configures for parallel signature analysis functions where the AMSK and AREF registers serve a parallel signature analysis generator. Either the program address or memory address can be configured as the parallel signature analysis input. The parallel signature analysis calculation begins when the parallel signature analysis function is enabled and terminates when the address comparison unit 310 function is specified as OFF or the function is changed. Table 4 shows the function specific bit definition of register ACNTL for counter functions.

TABLE 4

| Function | Bit(s) | Description |
| --- | --- | --- |
| ASELA[1:0] | 08:07 | Select Address - Select address for event comparison<br>00 - Select no address<br>01 - Select program address<br>10 - Select memory address<br>11 - Reserved |
| Reserved | 06 | Reserved |
| Don't Care | 05:00 | These bits are a don't care for the parallel signature analysis function |

The address comparison unit 310 configures to an off mode where either the debug software or application retains ownership but the address comparison unit 310 block is off. In this off configuration, the current owner retains ownership. For the unclaimed mode, neither the debug software or application retains ownership and the address comparison unit 310 block is off.

The data comparison unit 320 event generation works in tandem with the address comparison unit 310 event generation to provide address and data breakpoints. This feature requires that the two units be joined. The address comparison unit 310 event detects the address match while the data comparison unit 320 detects the read data or write data match associated with an access. The address comparison unit 310 address comparison is delayed to align with the data comparison unit 310 event processing.

According to a preferred embodiment of the invention, the address comparison unit 310 provides a unique ability to compare a user supplied input to a multitude of references and a Page Look-Up RAM simultaneously to effect individual comparisons of up to 8 pages of addresses. The user inputs supplied to the megamodule Core can be parallel signature analyzed or used as events. The selection of the address comparison unit 310 parallel signature analysis mode is made available to the logic outside the CPU megamodule.

Figure 8:
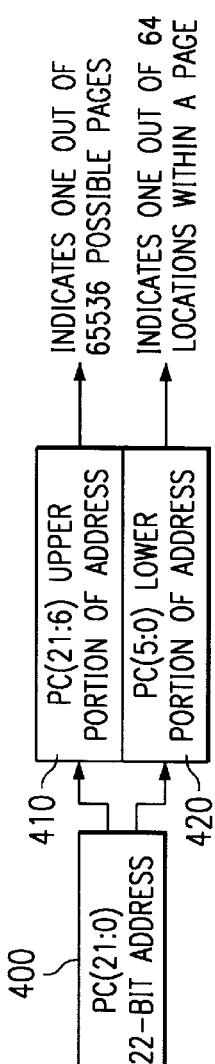
FIG. 8 illustrates a block diagram of how a 22 bit address is partitioned into a 16 bit upper portion 410 and a 6 bit lower portion 420 as a preferred embodiment of the current invention.

According to a first preferred embodiment of the invention, instead of a conventional prior art address comparator 310 which compares a bus address to one reference address, the address comparator of the current invention, through the use of several reference registers and a Page Address Look-Up RAM, compares a bus address to numerous addresses on multiple pages. The multitude of comparisons is implemented with the following procedure. The first step is illustrated in FIG. 8. First the bus address 400 is broken up into two portions: an upper bits portion 410 consisting of a 16 bit address, and a lower portion 420 consisting of a 6 bit address. Although the illustrative example provided in this first preferred embodiment describes how address comparator circuitry 500 for 22-bit addresses and a 64 address page (6 bits equals 64 different possible addresses per page) works, these concepts can be extended to different sizes of addresses and pages, but for purposes of illustration, we will only examine the 22-bit address/64 address page. Likewise, the Page Lookup RAM 440 (of 64 different possible addresses) can be of different sizes—allowing for greater or lesser number of pages to be compared against. This description will refer to an 8-bit RAM 440 (which comprises words 8 bits long), which allows for 8 different pages to be compared against.

The purpose of a Page Lookup RAM 440 is to determine if a particular 22-bit address is one for which the user wants to perform a special action. If the 22-bit address is an address of interest, then the Page Lookup RAM 440 will assert a signal called "match", which can be used by subsequent circuitry to indicate that the special action is to be performed. There can be multiple addresses at which this special action will be performed—if any of these multiple of addresses matches the particular 22-bit address, then "match" is asserted. This example allows for 64 addresses within 8 different pages to be compared against the 22-bit address, to see if there is a match.

The 22-bit address can be used to reference words within RAM or ROM blocks, peripheral registers, and other "memory-mapped" locations. Different ranges of addresses can be organized into many conceptual groupings; the arrangement of interest for this invention is to organize memory as 65536 pages (a 16 bit upper portion 410 of an address) of 64 words (a 6 bit lower portion 420 of an address).

FIG. 8 illustrates how within a 22-bit address, according to a preferred embodiment of the invention, the upper and lower bits of the address are divided into the lower 6 bits of the address 420, which indicate the address within a page (a range of 64 addresses), and the upper 16 bits of the address 410, which indicate the particular page (a range of 65536 pages). Six signals (0 through 5) are required, as inputs to Page Look-up RAM 440, to indicate an address from 0 through 63 (i.e. a range of 64 addresses), and 16 signals (6 through 21) are required, as inputs to each of reference registers 430–437, to indicate the page from 0 through 65535 (i.e. 65536 possible pages).

Figure 9:
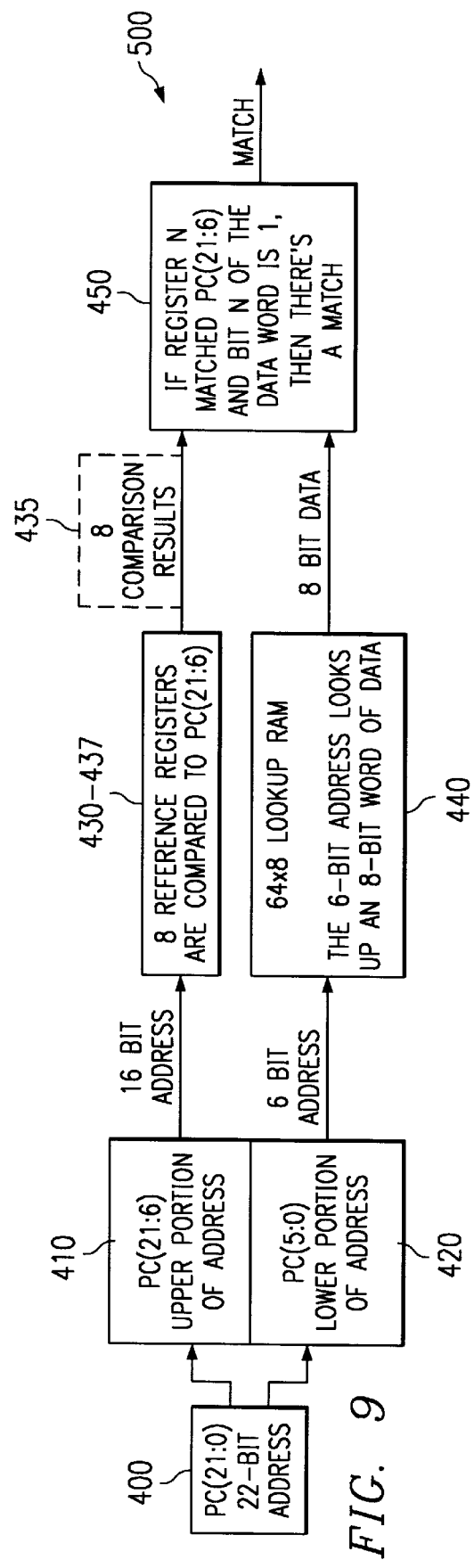
FIG. 9 illustrates a block diagram of the manner in which the 16 bit upper portion 410 and the 6 bit lower portion 420 of the address are compared against 8 different reference registers 430–437 and looked-up in a 64×8 Page Look-up RAM 440 respectively to yield "match_high" s and "match_low"s.

FIG. 9 illustrates how the upper and lower portions of the 22-bit address 400 are used. The upper 16 bit portion of the address 410 is compared to 8 (or N) different 16 bit reference registers 430–437, which indicate 8 different pages of interest or 8 different addresses on which the programmer would like to trigger an event, i.e. initiate a debug-routine. The lower 6 bit portion of the address 420 is used to lookup which addresses within each of the 8 different pages are of interest. For a value of reference registers, N(430–437), from 0 through 7 (representing any of the 8 different pages of interest), if Register N(of registers 430–437 so for example register 432 which is actually the third register or register #2(not register #0, or register #1)) matches the page of interest, and bit N(or the third bit) of the addressed word (according to the last 6 bits or the lower 6 bit portion of the address 420) of the of the 8-bit Lookup RAM is set to 1, then we have a match. A match can trigger an event, i.e. initiate a debug routine, or have any number of predetermined outcomes as desired by the programmer.

Figure 10:
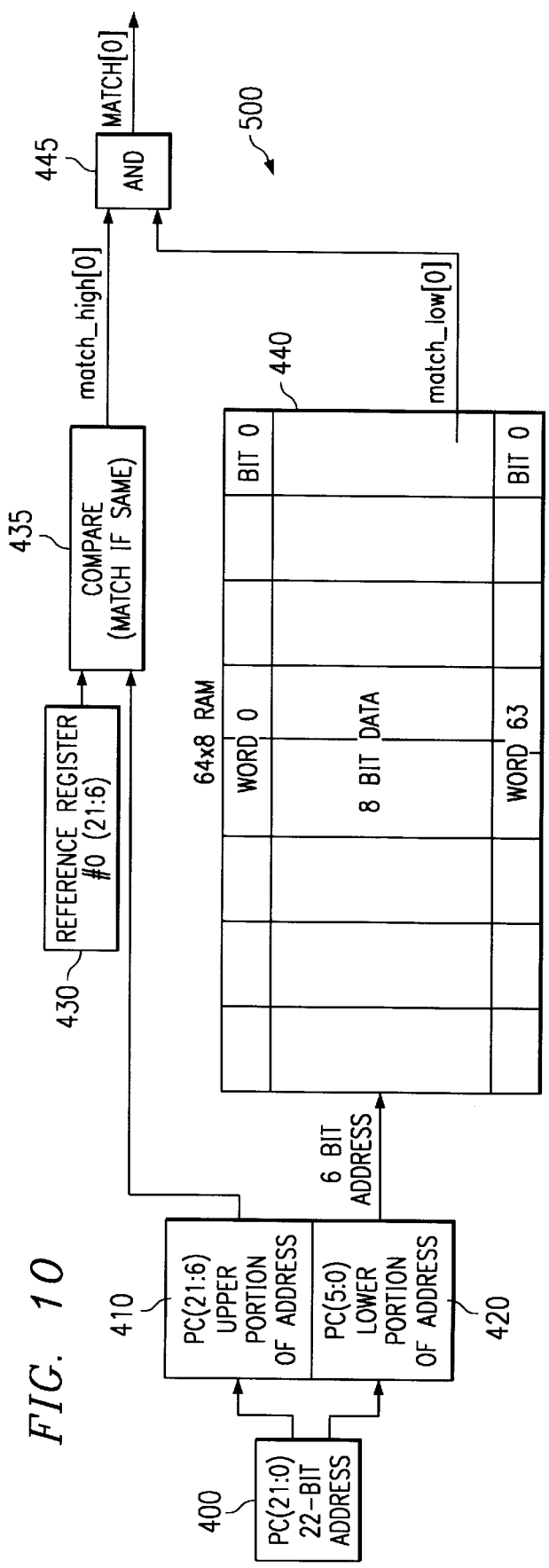
FIG. 10 illustrates a block diagram of a more detailed Page Look-up RAM 440 and an illustration of just one 430 of the 8 reference registers 430–437 of FIG. 9.

In FIG. 10, an illustration of a close-up of the content of the Page Look-Up RAM 440 and how just one of the 8 different pages (430–437) works is shown. The upper 16 bit portion of the address 410 is compared against reference register #0 430, to see if the 22-bit address refers to this page. If the upper 16 bit portion of the address 410 does match the 16 bit address in reference register #0 430, then match_high[0] is set to 1. The lower 6 bit portion of the address 420 looks-up 8-bits worth of data in the Lookup RAM. Bit 0 is used as match_low[0] as bit 0 corresponds to reference register #0. Therefore, if bit 0=1, bit 0 is a match_low[0]. If we had matched the upper 16 bit portion of the address 420 to reference register #2(match_high[2]) instead, then bit 2 of the of the 8 bit word looked up in the RAM 440 would be used as the match_low[2]. The match_high[0] and match_low[0] are brought into a Boolean AND function 440. If and only if both are 1 will match[0] be a 1. This indicates that we have a match. This operation will be performed, in parallel, for all 8 of the reference registers 430–437.

An example using a binary 22 bit bus address implementing FIG. 10 is now described. The 22 bit bus address 0x00 1002(written in hex) is broken down into a 16 bit upper portion [21:6]=00 0000 0001 0000 00b(b means the numeral representation is in binary form) and a 6 bit lower portion [5:0]=00 0010b. The lower 6 bits 420 would look-up word #2 in the Page Look-Up RAM 440 (which has 64 possible words, i.e. $2^6$), because 00 0010 in binary is 2 in decimal, or the second word of the 64 entry×8 bit RAM. If the lower bits of the bus address 420 were 00 0011b instead, then we would look up word #3(because 00 0011b is 3 in decimal, we would look up the third word, etc.). Each of the 64 possible words in the Page Look-up RAM contains 8 bits, each of which will possibly form the "match_low[7:0]". If a particular bit of a particular word is a 1, then we want that particular bit of that particular word to match a corresponding equity compare register(reference register 430) as described in more detail below.

We have stored in 16 bit equity compare registers 430, 431, 432, 433 the following interesting addresses: equity compare register #0=00 0000 0000 00b, which can match the addresses in the range 0x00 0000–0x00 003F; equity compare register #1=00 0000 0000 01b, which can match the addresses in the range 0x00 0040–0x00 007F; equity compare register #2=00 0000 1100 00b, which can match addresses in the range 0x00 0C00–0x00 0C3F; equity compare register #3=00 001 000 00b, which can match addresses in the range 0x00 10000–0x00 103F. The 16 bit addresses stored in equity registers 430, 431, 432 and 433 can match such a wide range of 22 bit addresses because the last 6 bits of each 22 bit addresses are don't cares for each 16 bit address. Therefore, each 16 bit equity compare register address is able to match 64 addresses, the 64 addresses stored in the Page Look-up RAM 440. Although only 4 equity bit registers 430, 431, 432 and 433 are illustrated in this example, a preferred embodiment of the invention comprises 8 different equity compare registers 430–437.

If the 16 bit upper portion 410 of the bus address matches the address within equity compare register #0, then match_high[0]=1, if the 16 bit upper portion 410 of the bus address doesn't match the address within equity compare register #0, then match_high[0]=0. Likewise, if the 16 bit upper portion 410 of the bus address matches the address within equity compare register #3, then match_high[3]=1, and if the 16 bit upper portion 410 of the bus address doesn't match the address within equity compare register #3, then match_high[3]=0, etc. for all other equity compare registers. Now, looking at the bus address 400 of 0x00 1002, match_high[0]=0, match_high[1]=0 and match_high[2]=0, because the bus address doesn't fall within any of the ranges of addresses covered by those equity compare register addresses. However, match_high[3]=1, because the bus address 0x00 1002 does fall within the range of addresses 0x00 1000–0x00 103F covered by equity compare register address 00 0001 0000 00b.

The next step is to look-up the lower portion 420 of the bus address 400 in the Page Address Look-up Range RAM 400. The particular word within the RAM 400 is chosen, of course, by the 6 bit address of the lower portion 420 of the bus address. In this example, the 6 bit address of the lower portion 420 of the bus address is 00 0010b, which corresponds to the second word in the RAM(2 in decimal). Then within the second word, the bit of interest is the third bit, because match_high[3]=1 (in order to cause the event, both the match_high and the match_low have to be 1). So, if the third bit of the second word in the RAM 400 is a 1, then match_low[3]=1. Therefore, because match_high[3]=1 and match_low[3]=1, the event will occur. If bit 3 of word 2 is zero, then match_low[3]=0. With match_low[3]=0, (match_high(X) and match_low[3])=0, where X is the output of any of the equity compare registers.

Figure 11:
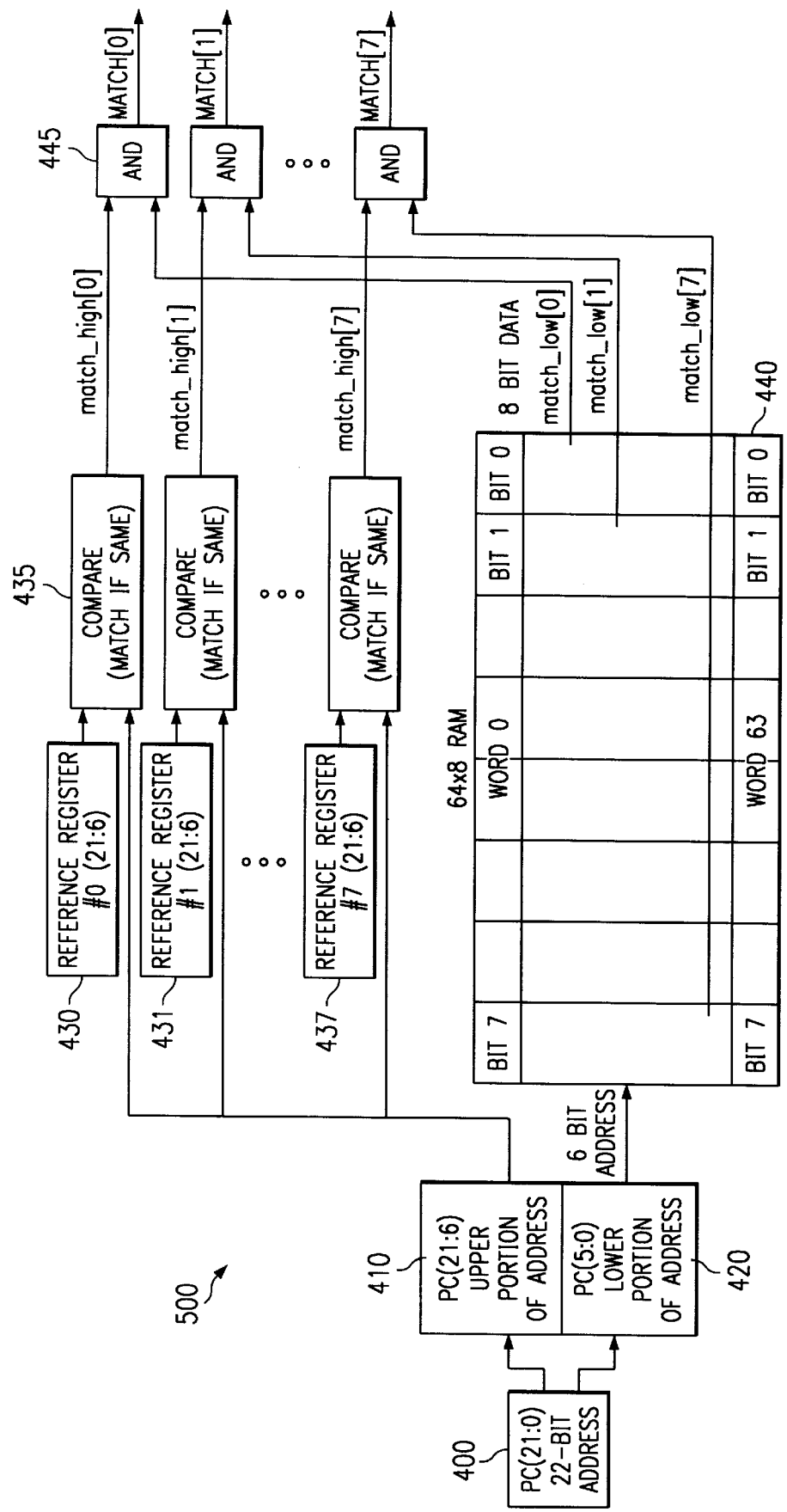
FIG. 11 illustrates a block diagram of several reference registers 430, 431, 437 of the 8 reference registers 430–437 and how the 16 bit upper portion 410 of the address is matched against the reference registers 430–437 to yield "match_high"s and the 6 bit lower portion 420 of the address is looked up in the Page Look-Up RAM 440 to yield corresponding "match_low"s, which "match_high"s and corresponding "match_low"s are then ANDed to cause the event if both "match-high" and "match_low" are true.

FIG. 11 illustrates how 3 pages 430, 431, and 437 of the 8 different pages 430–437 can be compared against the bus address. Therefore, as described with reference to FIGS. 8–10, the 16 bit upper portion of the address 410 is compared to 8 different reference registers 430–437(although FIG. 11 only illustrates the upper 16 bit portion 410 being compared against each of reference register #0 430, reference register #1 431 and reference register #7 437(an illustration showing all 8 reference registers 430–437 would be a little too cluttered to be easily readable). As the 16 bit upper portion of the address 410 is compared against each of the 3 reference registers, 430,431,437 a match_high results upon a finding of a match. Therefore, if the 16 bit upper portion of the address 410 matches the 16 bit address in reference register #0 430, then match_high[0] is set to 1 in comparison circuitry 435. Likewise, if the 16 bit upper portion of the address 410 matches the 16 bit address in reference register #1 431, then match_high[1] is set to 1 in comparison circuitry 435. And again, if the upper 16 bit portion of the address 410 matches the 16 bit address of reference register #7 437, then match_high[7] is set to 1 in comparison circuitry 435.

Figure 12:
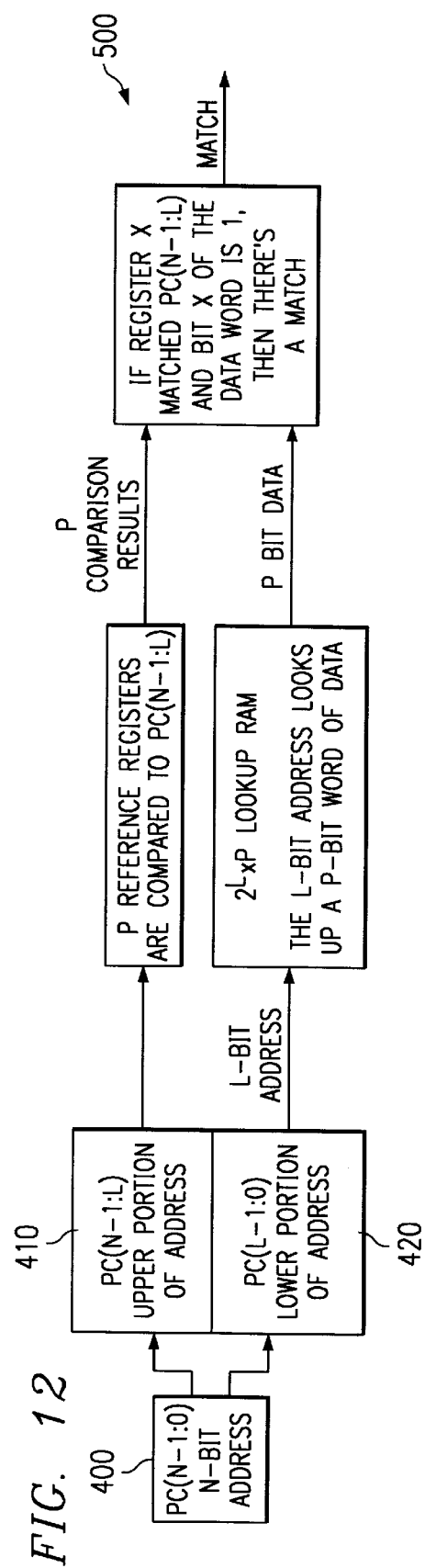
FIG. 12 illustrates a block diagram of the same address comparison illustrated in FIGS. 8–11 but described in more general terms.

The invention described so far has a 22-bit address, a 64 address page, and compares against 8 different pages. Variations on these numbers can be easily comprehended. FIG. 12 illustrates for an N-bit address can be divided into an upper portion of U-bits 410, and a lower portion of L-bits 420, where U+L=N. The value $2^L$ will normally correspond to the page size for that processor's architecture, although it doesn't have to (this invention can be used on processors which don't have any special circuitry for pages—in this context, a page is simply an abstraction of how memory is arranged). The lookup RAM 440 will contain $2^L$ words. The reference registers 430 will be U-bits in length. There can be P different reference registers 430 to compare against. The Lookup RAM 440 used will be $2^L \times P$ in size. The workings of the block circuits illustrated in FIG. 11 are described in previous FIG. 8 and FIGS. 9–10.

What is claimed is:

1. A method of causing an event, comprising the steps of:

providing an address, having an upper bit portion and a lower bit portion;

comparing said upper bit portion of said address against one or more reference registers for yielding one or more "match-high's";

locating said lower bit portion of said address within a memory look-up table for yielding one or more "match-lows";

causing the event upon the occurrence of both the "match-high" and "match-low" being true;

wherein said lower bit portion indicates a word address in said look-up table;

wherein said address has N bits, said word address has P bits and wherein said one or more reference registers comprises P particular reference registers; and wherein one of said P particular reference registers correspond to one of said bits of said P bit word address.

2. The method according to claim 1 wherein upon said one corresponding bit of said P bit word address equaling 1, said match_low corresponding to said bit is true.

3. The method according to claim 1, wherein said upper bit portion of said address comprises N–L bits where L is the number of bits in said lower bit portion of said address.

4. The method according to claim 3 wherein said memory look-up table comprises $2^L$ entries and is P bits wide.

5. The method according to claim 3 wherein said reference register comprises (N–L) bits.

6. The method according to claim 3 wherein said upper portion of said address comprises (N–L) bits.

7. The method according to claim 1 wherein there are more than one "match_high"s and "match_low"s.

* * * * *